Aug. 6, 1940.  F. D. PELTIER  2,210,496
REFRIGERATION
Filed Oct. 6, 1937
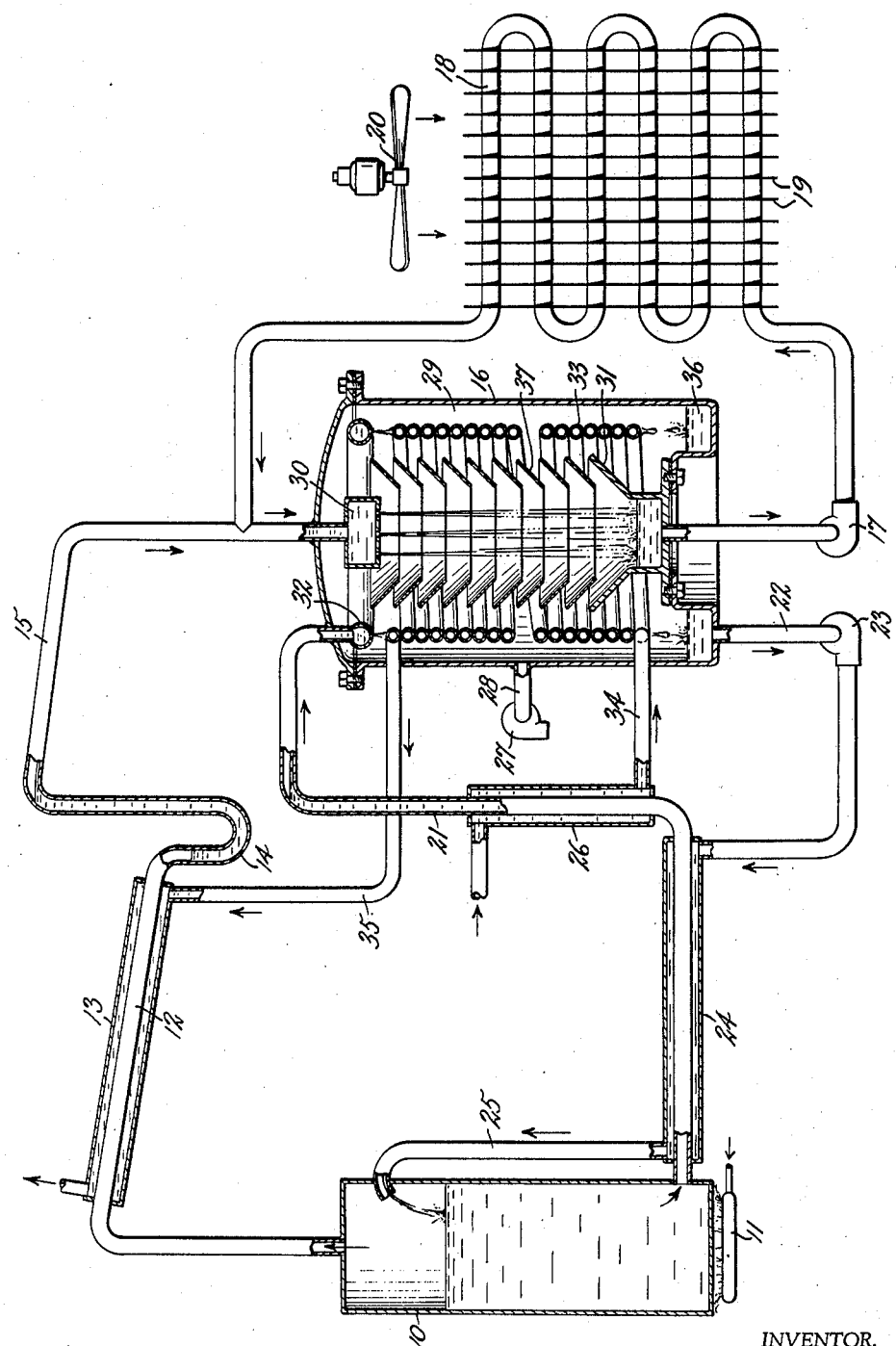
INVENTOR.
Frank D. Peltier
BY
E A Fenander his ATTORNEY.

Patented Aug. 6, 1940

2,210,496

UNITED STATES PATENT OFFICE 2,210,496

REFRIGERATION

Frank D. Peltier, Indianapolis, Ind., assignor to Servel, Inc., New York, N. Y., a corporation of Delaware Application October 6, 1937, Serial No. 167,512

11 Claims. (Cl. 62—119)

My invention relates to refrigeration, and more particularly to an absorption type refrigerating system.

It is an object of the invention to provide a more efficient method and apparatus of this type in which refrigerant is vaporized and the vapor is absorbed into solution in a single chamber, as will appear from the following description and accompanying drawing in which the single figure diagrammatically illustrates an embodiment of the invention.

Referring to the drawing, the absorption refrigerating system embodying the invention utilizes water as a refrigerant and includes a generator or reactivator 10 containing water in solution in a body of absorption liquid, such as potassium hydroxide. The generator 10 is heated in any suitable manner, as by a gas burner 11, for example, whereby water vapor is expelled out of solution. The water vapor flows upward into a liquid cooled condenser 12 in which it is liquefied, the condenser having a jacket 13 through which a cooling fluid is circulated.

From the condenser 12 condensed water vapor flows through a U-shaped liquid trap conduit 14 and conduit 15 into a casing or shell 16 forming a combined evaporator and absorber. The water, which falls in a spray or shower, evaporates in casing 16 to produce a refrigerating effect by lowering the temperature of the water due to change in sensible heat of water to heat of vaporization. The cooled water is collected in the bottom of casing 16 and circulated by a pump 17 through a coil 18 having heat transfer fins 19. The coil 18 is arranged in heat exchange relation with a medium to be cooled. As shown, a fan 20 is provided to cause air to flow over the surfaces of coil 18 and fins 19, whereby the air is cooled by heat transfer to the cold water flowing through coil 18. The water is returned from coil 18 to the upper part of casing 16.

Water vapor in casing 16 is absorbed into absorption liquid which enters the upper part of the casing through a conduit 21. Absorption solution enriched with water flows from the bottom of casing 16 through a conduit 22, and is pumped by a pump 23 through an outer passage of a liquid heat exchanger 24 and a conduit 25 to the upper part of generator 10. Absorption solution from which water has been expelled, due to heating by burner 11, flows from the lower part of generator 10 through the inner passage of liquid heat exchanger 24 and conduit 21 to the upper part of casing 16. A jacket 26 is provided about a part of conduit 21 and a cooling fluid is circulated therethrough to effect cooling of absorption liquid flowing to the casing 16.

The combined evaporator and absorber 16 is at a lower pressure than generator 10 and condenser 12. This pressure difference is maintained in the several conduits by pump 23 and liquid columns in conduits 14 and 21. A vacuum pump 27 or other suitable device is connected by conduit 28 to casing 16 to remove non-condensible gas from the system so that a desired low pressure is maintained.

The casing 16 forms a single chamber 29 in which both evaporation of water and absorption of water into solution take place. Within the upper part of casing 16 is located a spray head 30 to which is connected the lower end of conduit 15. The spray head 30 is preferably located substantially centrally of the casing and directly above a sump 31 into which the spray water collects. From the sump 31 cold water flows to pump 17 and is circulated through coil 18, as described above.

About the spray head 30 and substantially at the same level is arranged an annular header 32 into which absorption solution is introduced through conduit 21. The header 32 is provided with a plurality of openings whereby absorption liquid descends in sheet-like form over the successive turns of a cooling coil 33. The heat liberated with absorption of water vapor is transferred to a cooling fluid which flows through coil 33.

The cooling coil 33 and jackets 13 and 26 may be connected in series by conduits 34 and 35, whereby the same cooling fluid may be circulated through these parts. At the lower part of casing 16 and below sump 31 is formed an annular well 36 into which enriched absorption solution collects. To the well 36 is connected the upper end of conduit 22 through which absorption liquid is returned to generator 10.

Between the regions of the water spray and curtain of descending absorption liquid are provided annular-shaped inclined baffles 37. The baffles 37 are arranged one above the other and are inclined upward and outward, whereby any spray water contacting the baffles flows into the inner spray region. The apertured dividing wall thus provided prevents mixing of the spray water and absorption solution, and at the same time the spacing of the baffles permits free circulation of water vapor throughout the height of chamber 29 from the inner spray region to the outer region where absorption of vapor into solution takes place. Due to the upward inclination of the baffles 37, vapor is directed upward in counterflow to the descending absorption solution.

In addition to preventing mixing of water and absorption solution, the overlapping of the baffles in a vertical direction effectively retards the transfer of radiant heat from the warmer absorption region to the cooler evaporation region. The baffles 37 may be formed of metal having bright reflecting surfaces to reduce the transfer of radiant heat.

While a particular embodiment of the invention has been shown and described, I do not wish to be limited to the arrangement set forth since it will be apparent to those skilled in the art that modifications and changes may be made without departing from the spirit and scope of the invention, as pointed out in the following claims.

What is claimed is:

1. In a low pressure absorption refrigerating system making use of evaporation of water and absorption of water vapor into solution into an absorption solution, structure forming a chamber within which both evaporation of water and absorption of water vapor into solution take place, and a dividing wall in said chamber arranged to prevent mixing of water and solution and having openings to permit flow of vapor therethrough.

2. In the art of refrigeration by evaporation of water at low pressure and absorption of water vapor into solution, that improvement which consists in flowing and evaporating water in one region, flowing absorption liquid in a path parallel to the water at a region immediately adjacent to said first region, and causing vapor to flow from a plurality of points at different elevations in said first region to correspondingly higher different elevations in said second region.

3. A method of refrigerating which includes causing flow of refrigerant by gravity and evaporation thereof in one region, causing flow of absorption liquid by gravity in a region adjacent to said first region, and causing flow of vapor from different points in said first region in a plurality of separate parallel paths of flow to said last-mentioned region while preventing the mixing of refrigerant and absorption liquid.

4. In a refrigeration system having a plurality of parts including a generator, a condenser, and a combined evaporator and absorber, said parts being interconnected for circulation of fluids therein, an apertured dividing wall in said combined evaporator and absorber arranged to prevent flow of fluid in liquid phase therethrough and permit flow of vaporous fluid therethrough.

5. In an absorption type refrigeration system, a combined evaporator and absorber structure forming a chamber, conduit means to introduce absorption liquid and refrigerant into said chamber, and an apertured dividing wall in said chamber arranged to prevent mixing of absorption liquid and refrigerant while permitting flow of vapor therethrough.

6. In an absorption type of refrigeration system, a combined evaporator and absorber structure forming a chamber, conduit means to introduce absorption liquid and refrigerant into said chamber for flow therein in regions adjacent to each other, and a plurality of members arranged in overlapping relation to form a barrier between said regions to prevent mixing of absorption liquid and refrigerant and spaced to permit flow of vapor therebetween.

7. In a low pressure absorption refrigeration system making use of evaporation of water and absorption of water vapor into solution in an absorption liquid, a combined evaporator and absorber structure forming a chamber, means to spray water in said chamber, means to cause flow of absorption liquid in said chamber, and a plurality of baffles arranged to form a dividing wall to prevent splashing of liquid between the paths of flow of water and absorption liquid and spaced to permit flow of vapor through said wall.

8. In a low pressure absorption refrigeration system making use of evaporation of water and absorption of water vapor into solution in an absorption liquid, a combined evaporator and absorber structure forming a chamber, means to spray water downward in said chamber, means to cause flow of absorption liquid by gravity in said chamber, and a plurality of spaced baffles arranged one above the other and inclined upward and toward the path of flow of absorption liquid.

9. In an absorption type refrigeration system, means for creating adjacent streams of refrigerant liquid and absorption liquid, and a wall between said streams comprising members constructed and arranged to prevent passage of liquid by splashing from one stream to another and permit flow of vapor through said wall.

10. Refrigeration system as set forth in claim 9 in which said wall comprises spaced overlapping frusto-conical members.

11. A refrigeration system as set forth in claim 9 in which said streams are substantially parallel, said wall intersects all perpendicular lines between said streams, and said wall has heat reflecting surfaces for obstructing heat transfer by radiation between said streams.

FRANK D. PELTIER.